Inventor:
George E. Whitney.
by Emery Booth Janney & Varney
Attys

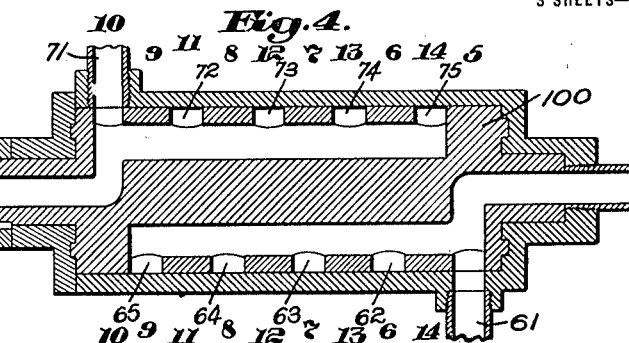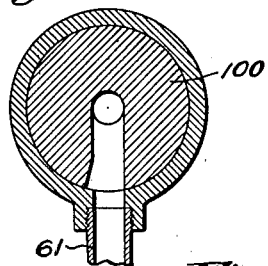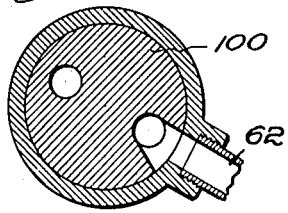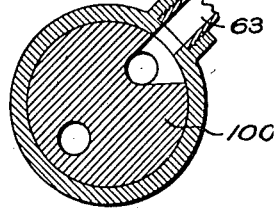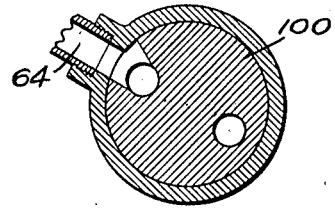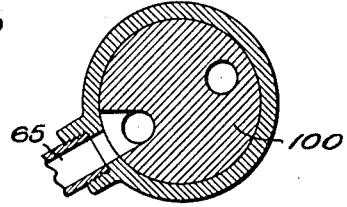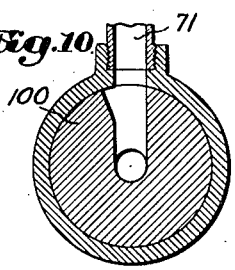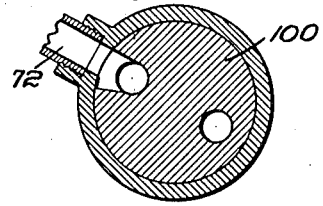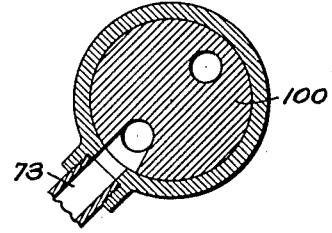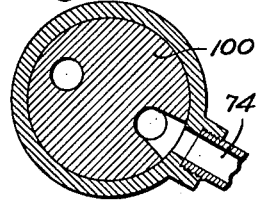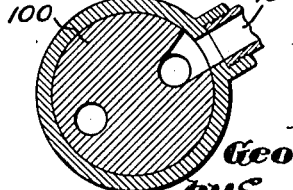

UNITED STATES PATENT OFFICE.

GEORGE E. WHITNEY, OF BRIDGEPORT, CONNECTICUT, ASSIGNOR TO INTERNATIONAL PAVEMENT COMPANY, OF HARTFORD, CONNECTICUT, A CORPORATION OF CONNECTICUT.

PRESS.

1,317,119.  Specification of Letters Patent.  Patented Sept. 23, 1919.

Application filed June 13, 1917. Serial No. 174,486.

*To all whom it may concern:*

Be it known that I, GEORGE E. WHITNEY, a citizen of the United States, and a resident of Bridgeport, in the county of Fairfield and State of Connecticut have invented an Improvement in Presses, of which the following description, in connection with the accompanying drawings, is a specification, like characters on the drawing representing like parts.

This invention pertains to improvements in presses more particularly, though not exclusively, to improvements in presses for making highly compressed units from plastic masses.

In the drawings, which show a preferred construction of one illustrative embodiment of my invention:

Figs. 4, 5, 6, 7, 8, 9, 10, 11, 12, 13 and 14 show details of one form of valve mechanism well suited for use in connection with my invention.

Figure 1:
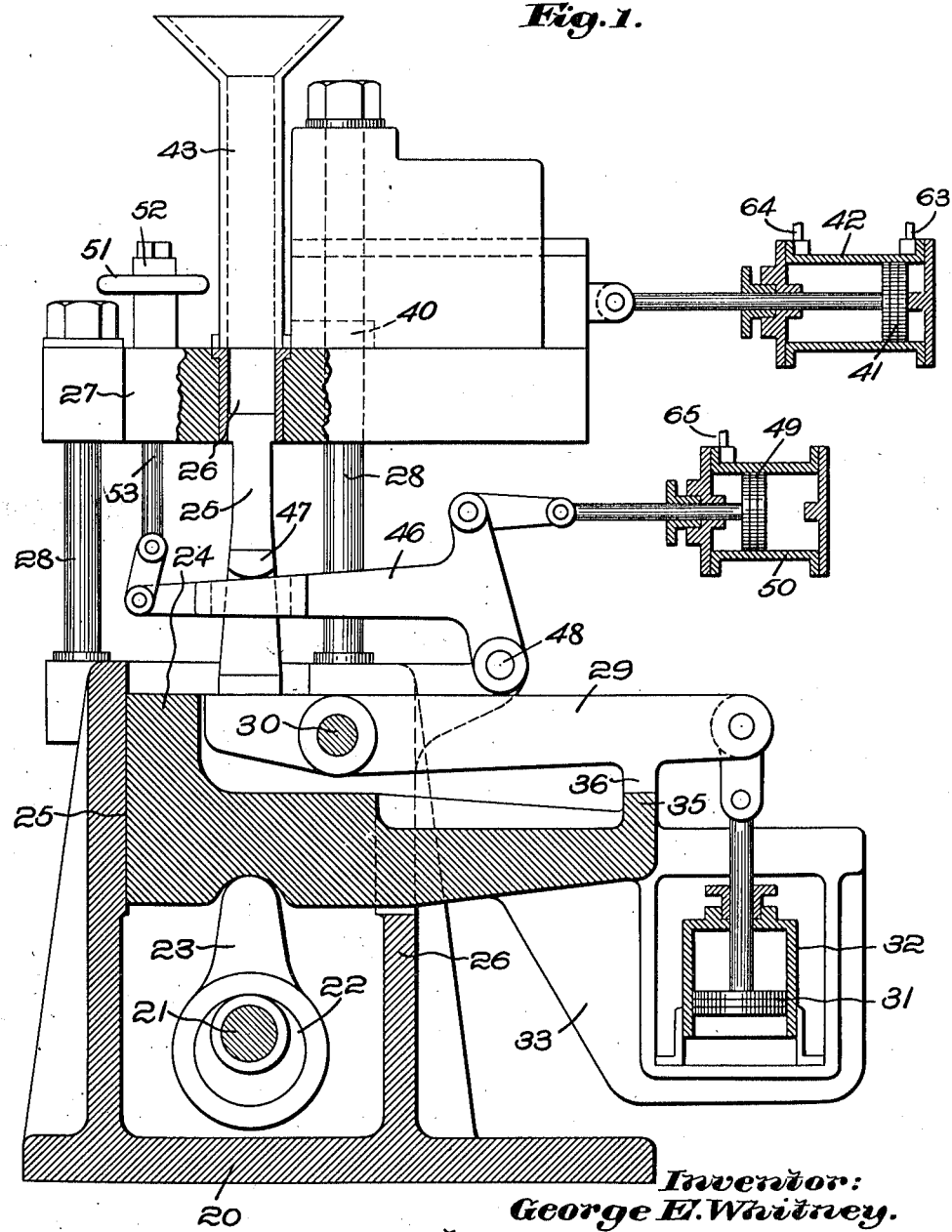
Figure 1 is a vertical, longitudinal section through the center line of the press, and partly in elevation.

In Fig. 1 I have shown a bed 20 carrying in any suitable bearings the main driving shaft 21 on which is mounted an eccentric 22 coöperating with a pitman 23 bearing against a reciprocable element 24, slidable in guides 25 and 26 in the frame of the machine. The reciprocable element 24 carries a mold plunger 25, reciprocable in a mold 26 of a mold block 27 supported by columns 28 extending upwardly from the frame of the machine. To conpensate for varying stroke of the mold plunger 25 as determined by the resistance of the material under compression, while permitting the constant amplitude of reciprocation of the reciprocable element 24 actuated by the eccentric 22, I have shown interposed between the reciprocable element 24 and the mold plunger 25 pressure determining means typified by the lever 29 fulcrumed at 30 in the reciprocable element 24 and connected at its outer end to the piston 31 in a cylinder 32 carried by an extension 33 from the reciprocable element 24. I preferably provide abutments 35 and 36 on the reciprocable element 24 and the lever 29 respectively, adapted to limit the upward movement of that end of the lever 29 which carries the plunger 25, while permitting deflection of said end of said lever against the pressure of a fluid, preferably elastic, in the cylinder 32. It will be noted that the cylinder 32 and the fulcrum 30 are both carried by the reciprocable element 24, so that there will be no pressure-fluid-actuated tendency to tip the latter or make it bind in its guides.

To fill, cover, uncover and empty the mold 26, which, as shown, is preferably stationary, I have shown molding instrumentalities typified by the reciprocable mold cover 40 adapted to be reciprocated by pressure fluid acting on a piston 41 in the cylinder 42, the filling neck or conduit 43 reciprocable in a path transverse to the path of reciprocation of the mold cover 40 by pressure fluid acting on a piston 44 in the cylinder 45, and mold emptying means typified by the lever 46 (Fig. 1) adapted to engage projection 47 on the mold plunger 25 and to be rocked about a fulcrum 48 on the frame of the machine by the piston 49 of the cylinder 50. To control the amount of material in the mold I may provide a feed wheel 51 having a feed nut 52 engaging a threaded rod 53 connected to the outer end of the lever 46 and adapted to limit the downward movement of said lever 46 and hence, through the lugs 47, to limit the downward movement of the mold plunger 25.

Figure 2:
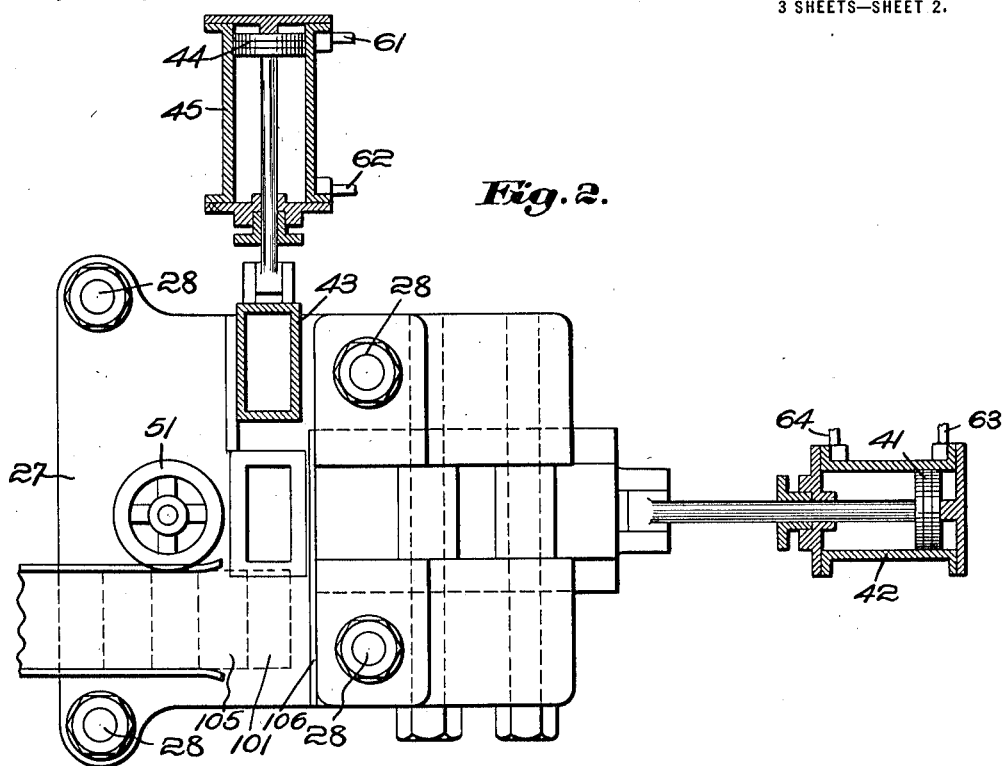
Fig. 2 is a plan view, partly in horizontal section.
Figure 3:
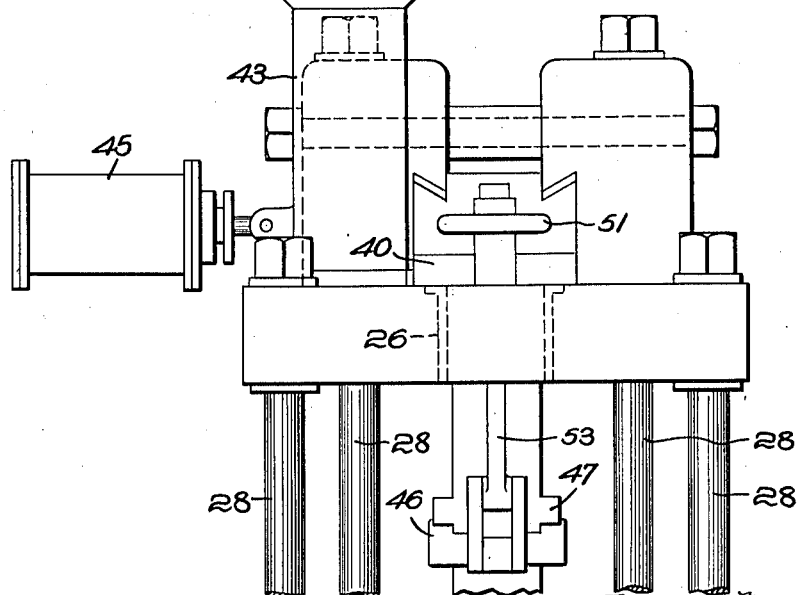
Fig. 3 is a partial end elevation, viewed from the left of Fig. 2.

Pressure fluid may be admitted and exhausted from the various cylinders 41, 45 and 50 by any suitable valve mechanism, but I prefer to utilize a rotary valve driven by a sprocket 60 and timed one to one with the main shaft 21 of the press. In Fig. 4 I have shown a longitudinal section of a valve well adapted for this purpose. In Figs. 5, 6, 7, 8, 9, 10, 11, 12, 13 and 14 I have shown transverse sections through the valve on the lines 5—5, 6—6, 7—7, 8—8, 9—9, 10—10, 11—11, 12—12, 13—13 and 14—14 respectively. The pipe 61 connects the rear end of the cylinder 45 with the valve (Figs. 2 and 5). The pipe 62 connects the front end of the cylinder 45 with the valve (Figs. 2 and 6). The pipe 63 connects the rear end of the cylinder 42 with the valve (Figs. 1 and 7). The pipe 64 connects the front end of the cylinder 42 with the valve (Figs. 1 and 8). The pipe 65 connects the front end of the cylinder 50 with the valve (Figs. 1 and 9).

Each of the pipes 61, 62, 63, 64 and 65 has diametrically opposite it in the valve casing a corresponding exhaust pipe numbered 71, 72, 73, 74 and 75 respectively. The rotary valve 100 as it revolves connects and disconnects the various pipes leading therefrom with the pressure fluid supply and with the exhaust in such sequence as to produce the following operations of the machine. The details of the valve mechanism form no part of the present invention, and need not be described in detail.

Assuming the parts of the press to be in the relative position shown in Figs. 1 and 2, the mold 26 will contain a compressed block. The pressure fluid will now be admitted through the pipe 65, to the front of the steam cylinder 50, thereby to rock the lever 46 about its fulcrum 48 until the mold plunger 25 is flush with the top of the mold block 27 so that the block will have been ejected from the mold. Steam will now be admitted through the pipe 61 to the rear of the cylinder 45 so that the neck 43 will come forward until it registers with the mold. During this forward movement the compressed block will have been pushed by the front of the neck into the position indicated as 101 in Fig. 2. When the neck and mold are in register, steam will be exhausted from the front of the ejecting cylinder 50 through the pipe 65, thereby permitting the mold plunger 25 to drop and permitting the mold to be charged. Steam will now be exhausted from the rear end of the cylinder 45, and admitted through the pipe 62 to the front end of the cylinder 45, thereby retracting the neck 43 to the position shown in Fig. 2, the mold being left full of compressed material. Steam will now be admitted through the pipe 63 to the rear end of the cylinder 42, thereby pushing the mold cover or pressure block 40 forward until the mold is covered, after which the continued rotation of the driving shaft 21 will apply pressure through the eccentric 22, reciprocable element 24, pressure-determining mechanism, and mold plunger 25, to the contents of the mold. When a predetermined pressure has been reached, the mold plunger 25 will stop its upward movement, the lever 29 rocking about the fulcrum 30 and pulling up the piston 31 in the cylinder 32 to permit the eccentric 22 to complete its upward movement of the reciprocable element 24. After the eccentric 22 has passed its upward center and the reciprocable element 24 has been permitted to descend sufficiently to permit abutment of the projections 35 and 36, the mold cover 40 will be retracted by exhausting the steam from the rear of the steam cylinder 42 and admitting steam through the pipe 64 to the front end of the cylinder 42. This will have completed one cycle of operation of the press, a completed block being contained in the mold ready for ejection. The block 101, after being pushed to the position shown in Fig. 2 by the front of the neck 43, is pushed forward to position 105 by a strap 106, which is attached to and moves forward with the mold cover 40.

The principal advantage of the present invention is the relation of the stationary mold block 27 to the mold cover 40 and filling neck or conduit 43, all the necessary movements for filling, covering and uncovering the mold being effected by movement to two positions each of two relatively light elements, the movement also being of relatively short traverse. At the same time, the advantages of the stationary mold block are availed of.

While I have shown and specifically described a preferred construction of one embodiment of my invention, it will be understood that major changes therein involving omission, substitution, alteration, reversal and rearrangement of parts and operations may be made without departing from the scope of my invention, which is best defined by the following claims.

Claims:

1. A molding press, comprising in combination a stationary mold and a mold cover and mold filling conduit reciprocable independently of each other above said mold in a plane parallel to the top of the mold.

2. A molding press, comprising in combination a stationary mold and a mold cover and mold filling conduit reciprocable transversely to each other above said mold in a plane parallel to the top of the mold.

3. A molding press, comprising in combination a stationary mold; and a mold cover and mold filling conduit each automatically reciprocable in a plane parallel to the top of said mold to two determined positions of rest only relative to said mold.

4. A molding press, comprising in combination a stationary mold; a mold cover, pressure fluid means for reciprocating said mold cover; a mold filling conduit reciprocable independently of said mold cover, and means for reciprocating said conduit independently of, but timed relative to, reciprocation of said mold cover, both said conduit and said cover reciprocating in a plane parallel with the top of the mold.

5. A molding press, comprising in combination a stationary mold; a mold cover, pressure fluid means for reciprocating said mold cover to two positions of rest only; a mold filling conduit reciprocable independently of said mold cover, and means for reciprocating said conduit independently of, but timed relative to, reciprocation of said mold cover, both said conduit and said cover reciprocating in a plane parallel with the top of the mold.

6. A molding press, comprising in combination a stationary mold, a mold filling conduit, pressure fluid means for reciprocating said conduit, a mold cover, and means for reciprocating said mold cover independently of, but timed relative to, reciprocation of said conduit, both said conduit and said cover reciprocating in a plane parallel with the top of the mold.

7. A molding press, comprising in combination a stationary mold, a mold filling conduit, pressure fluid means for reciprocating said conduit to two positions of rest only, a mold cover and means for reciprocating said mold cover independently of, but timed relative to, reciprocation of said conduit, both said conduit and said cover reciprocating in a plane parallel with the top of the mold.

8. In a molding press, a stationary mold and independently reciprocable mold closing and mold filling means operating in a plane parallel with the top of the mold.

9. In a molding press, a stationary mold and independently transversely reciprocable mold closing and mold filling means operating in a plane parallel with the top of the mold.

10. In a block molding press, a mold, a mold filling conduit, a mold cover, block ejecting means, and block removing means, including initially a portion of said conduit and subsequently a portion of said mold cover.

11. In a block molding press, a mold, block ejecting means, and block removing means initially moving said block longitudinally and subsequently moving said block transversely in the same place as the longitudinal movement.

12. In a block molding press, the combination of a stationary mold oblong in plan, a mold filling conduit oblong in horizontal cross-section, a mold cover, means to reciprocate said conduit in the direction of its length, and means to reciprocate said mold cover in the direction of the width of said mold.

13. In a block molding press, the combination of a stationary mold oblong in plan, a reciprocable mold filling conduit oblong in horizontal cross section, a reciprocable mold cover, means to reciprocate one of said reciprocable parts in the direction of the length of the mold, and means to reciprocate the other of said reciprocable parts in the direction of the width of said mold.

In testimony whereof, I have signed my name to this specification.

GEORGE E. WHITNEY.